(12) United States Patent
Groene et al.

(10) Patent No.: US 11,199,302 B2
(45) Date of Patent: Dec. 14, 2021

(54) LIGHT OF A VEHICLE WITH A COVER LENS

(71) Applicant: HELLA GMBH & CO. KGAA, Lippstadt (DE)

(72) Inventors: Stefan Groene, Brakel (DE); Julien Hansen, Delmenhorst (DE); Philipp Lott, Haltern am See (DE); Arne Sebastian Saftig, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/013,466

(22) Filed: Sep. 4, 2020

(65) Prior Publication Data
US 2021/0062991 A1  Mar. 4, 2021

(30) Foreign Application Priority Data

Sep. 4, 2019  (DE) .................... 10 2019 123 660.6

(51) Int. Cl.
| | |
|---|---|
| *F21S 41/20* | (2018.01) |
| *G02B 1/18* | (2015.01) |
| *F21S 45/60* | (2018.01) |
| *F21S 41/143* | (2018.01) |
| *F21S 43/20* | (2018.01) |

(52) U.S. Cl.
CPC ............ *F21S 41/285* (2018.01); *F21S 41/143* (2018.01); *F21S 43/26* (2018.01); *F21S 45/60* (2018.01); *G02B 1/18* (2015.01)

(58) Field of Classification Search
None
See application file for complete search history.

(56) References Cited

U.S. PATENT DOCUMENTS 9,964,271 B2 * 5/2018 Erdl ...................... F21S 41/675

FOREIGN PATENT DOCUMENTS

| | | |
|---|---|---|
| DE | 10 2011 080 488 A1 | 8/2012 |
| DE | 20 2012 005 908 U1 | 8/2012 |
| DE | 10 2014 110 841 A1 | 2/2016 |

* cited by examiner

*Primary Examiner* — Vip Patel
(74) *Attorney, Agent, or Firm* — Muncy, Geissler, Olds & Lowe, P.C.

(57) ABSTRACT

A light of a vehicle with a cover lens, the light having a light source for generating light, the light having a shifter for shifting the wavelength of at least a portion of the light generated by the light source in the visible, short-wave range into radiation in the long-wave range, the shifter being disposed in the light in such a way that the long-wave radiation generated by the shifter is directed towards the cover lens.

14 Claims, 2 Drawing Sheets

LIGHT OF A VEHICLE WITH A COVER LENS

This nonprovisional application claims priority under 35 U.S.C. § 119(a) to German Patent Application No. 10 2019 123 660.6, which was filed in Germany on Sep. 4, 2019, and which is herein incorporated by reference.

BACKGROUND OF THE INVENTION

Field of the Invention

The present invention relates to a light of a vehicle with a cover lens, the light having a light source for generating light.

Description of the Background Art

Wavelength of visible light is in the range of about 380 nm to about 780 nm.

Lights on a vehicle are in particular known to be headlights and tail lights of a vehicle. These include one or more light sources, e.g. LEDs that are disposed in the area of a reflector, as well as a cover lens that ensures with its rear housing that the headlight and the tail light are sealed in a moisture-tight manner.

The problem with these lights, i.e. both the front headlights as well as the tail lights, is that at cold temperatures, layers of ice form on the covers lens of these lights due to condensation. At start-up, these ice layers cause the light generated by the frozen headlight to be absorbed and also non-directionally deflected in the ice layer, that is, the light is reflected or directed towards undesired areas of the road surface, such as towards oncoming traffic.

Whenever headlights are mentioned in the following, the same also applies to tail lights.

Due to the relatively efficient LED light sources in modern headlights, thawing of the cover lens takes place only very slowly since the heat emitted by the infrared radiation of the headlight is relatively low. This is also because, in an LED, the heat is mainly given off on the back and thus in the opposite direction to the cover lens. This means that it can take up to 30 minutes for the cover lens of such a headlight to thaw. In addition, the headlight can be covered with snow during snowfall, significantly limiting the functional performance of the headlight.

In this respect it is already known to arrange resistance heating elements in the form of thin wires in the cover lens. These not only influence the appearance, but also the illuminance distribution of the headlight. In addition, there are transparent resistance heating elements in the form of films, also used in windshields of vehicles. As a result of the curvature of the cover lenses of the headlights, these are unsuitable due to the risk of wrinkling when the films are applied.

Independently of this, in resistance heating elements in the form of thin wires or based on films that produce the required heating power, in addition to the waste heat of the headlight, sensors are required for temperature detection and control elements are required for control in order to achieve energy-efficient operation. Both of these factors make such a headlight relatively expensive.

It is also known to accommodate infrared emitters in the area of the light, for example the headlight. These require corresponding additional light sources, each with a separate power supply and corresponding control electronics.

It is also known to use the heat from LED modules via a convective air flow, which, due to the use of fans, requires additional installation space for guiding the air flow from the LED modules to the cover lens.

SUMMARY OF THE INVENTION

It is therefore an object of the present invention to provide enable in a simple manner the thawing of a frozen light, e.g. a headlight, and to also prevent the re-freezing of the light, for example, due to snowfall while driving.

To achieve the object, the invention proposes in an exemplary embodiment that the light has a shifter for shifting a wavelength of at least a portion of the light generated by the light source in the visible short-wave range into a radiation in the long-wave range, the shifter being disposed in the light in such a way that the long-wave radiation generated is directed towards the cover lens. The long-wave radiation can be oriented directly or indirectly, e.g. using lenses, reflectors or light guides, in the direction of the cover lens.

Thus, therefrom, for example the visible light, generated e.g. by an LED source, is used at least partially to transfer said light into a long-wave range by using the shifter, in particular into a wavelength range above the visible light (from 780 nm to 8000 nm) in order to keep the cover lens free of ice and snow by using the infrared radiation. For a better understanding, it should be noted that the transfer of the visible, short-wave light into the long-wave range can also take place only proportionally, that is, the light is only partially shifted into the infrared region. Both options, i.e. the full as well as the partial displacement, are included in the invention.

The shifter for shifting short-wave radiation into long-wave radiation has a wavelength-shifting coating. By means of such a wavelength-shifting coating, the light, which has a wavelength of about 380 nm to about 780, is at least partially shifted into the infrared region in order to use the resulting infrared radiation to keep the lens free of ice and snow. The relatively high degree of efficiency is advantageous here, due to the fact that the infrared radiation is generated where it is needed.

The wavelength-shifting coating can be arranged on the cover lens. In this context, according to two variants, it is possible on the one hand to arrange the wavelength-shifting coating on the inside of the cover lens or also on the outside of the cover lens.

Arranging the wavelength-shifting coating on the outside of the cover lens has the advantage that the infrared radiation allows for the direct heating and thus melting of the ice or snow on the cover lens, when ice and snow are absorbent in the long-wave range of the infrared radiation, in which the shift has taken place.

There is also the possibility of arranging the wavelength-shifting coating on the inside of the cover lens. In this case, the infrared radiation can have a wavelength range in which the infrared radiation is at least partially absorbed in the cover lens, leading to an immediate heating of the cover lens, which indirectly causes the ice and snow on the outside of the cover lens to melt. Due to the heating of the cover lens, the efficiency is a little poorer than that of the first variant. However, it is also conceivable to design the cover lens to be transmissive for at least part of the infrared radiation, i.e. in a certain wavelength range, so that the ice is melted both indirectly by the cover lens heated by absorption and directly by the transmitted radiation absorbed by the ice.

The wavelength-shifting coating can be designed as a fluorescent layer. If visible light hits a fluorescent layer, the wavelength is shifted into the greater wavelength to a certain extent, i.e. infrared components arise in the radiation of the light which then ensure that the cover lens of the headlight or the tail light is free from ice and snow.

The shifter for shifting short-wave light into long-wave radiation can be a material arranged in the cover lens. Here, it can be provided that a corresponding layer for shifting short-wave light into long-wave radiation is integrated in the cover lens; alternatively, there is the possibility of adding a corresponding wavelength-shifting material in the sense of compounding to the material of the cover lens prior to its shaping, e.g. by injection molding.

In particular, it is provided that the substance is fluorescent. That is, in this variant, too, short-wave light can at least partially be transferred into long-wave infrared radiation, wherein the cover lens is then heated by the long-wave radiation with a certain wavelength range by means of absorption, but also, a part of the long-wavelength radiation passes through the lens and is directly absorbed onto the lens from the ice or snow layer, causing the latter to melt. In particular, it can be provided that the substance is arranged as a layer in the cover lens.

The scattered light in the headlight can be used to shift the wavelength into long-wave radiation, wherein the shifter for shifting the short-wave light in the interior of the light and long-wave radiation is formed as a layer, which is arranged in the scattered light. The long-wave radiation, which is caused by the wavelength shift of the scattered light is in this case one that is either generated immediately in the headlight by the light source and, if appropriate, in conjunction with the reflector, or one that shows as a light when the cover lens is frozen, which is reflected into the interior of the headlight by the ice/snow.

There is the possibility of arranging the layer on the light reflector or in light interior in such a way that via the layer, a long-wave radiation is oriented towards the cover lens. Depending on which wavelength the cover lens allows through, this then leads either to a heating of the cover lens and/or the radiation being absorbed by the ice/snow layer, as has already been described elsewhere. The advantage here is that no electronic or electrical components are required, and that the long-wave radiation created by the wavelength shift of the scattered light, i.e. also by such visible light that is reflected in the layer of ice/snow into the interior of the headlight, results in a self-regulating effect which is characterized by the fact that the generated infrared radiation largely regulates itself down when the cover lens is defrosted.

The principle is ultimately the same for all variants or embodiments; it includes in using a material, e.g. a fluorescent layer or coating, to achieve an emission of long-wave radiation in the range of more than 780 nm, in particular in the range of 780 nm to 8,000 nm, i.e. a range which is commonly referred to as near and middle infrared, by at least partially absorbing short-wavelength light ranging from about 380 nm to 780 nm. The infrared radiation in this range is also referred to as thermal radiation at terrestrial temperatures.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
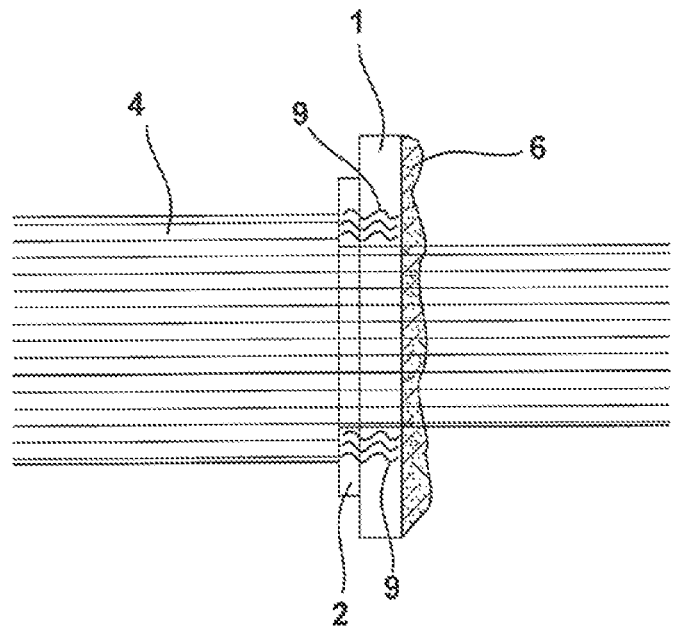
FIG. 1 schematically shows the mechanism of the wavelength-shifting coating when arranged on the inside of the cover lens.

In the exemplary embodiment according to FIG. 1, the cover lens 1 has a wavelength-shifting coating in the form of a fluorescent coating 2 on the inside of the cover lens. The cover lens and the coating form one component. For example, it is provided in FIG. 1 that the visible light 4 generated by the light source (not shown) strikes the wavelength-shifting coating 2 on the cover lens; here, e.g., 20% of the visible light is transferred through the wavelength-shifting coating 2 into the long-wave radiation 9 in the infrared range; the remaining 80% is made available as emitted visible light for purposes of illumination, e.g. toward the street. The 20% of the visible light, which is shifted into a long-wave range, serves to heat the cover lens 1 by absorption and/or by absorption in the ice/snow layer on the cover lens and ensures the melting of the ice or snow layer 6.

Figure 2:
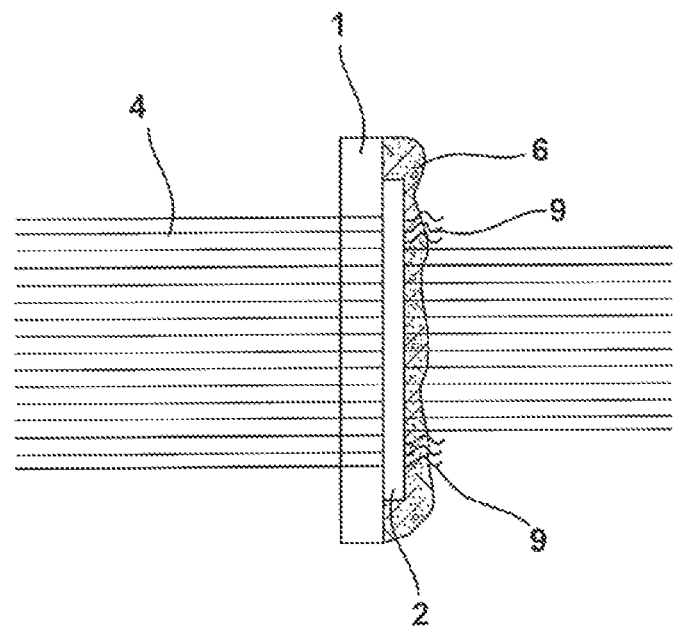
FIG. 2 schematically shows the mechanism of the wavelength-shifting coating when arranged on the outside of the cover lens.

According to FIG. 2 it is provided that the wavelength-shifting coating 2 is arranged on the outside of the cover lens 1, so that the infrared radiation 9 generated by the wavelength-shifting coating, e.g. by a fluorescent coating, is directly available for melting the ice and snow layer 6 by absorption in the ice/snow layer. Here, too, it shall apply that the visible light is proportioned by the wavelength-shifting coating, specifically into a portion, in this case, e.g. 20%, of a radiation 9 in the infrared range.

Figure 3:
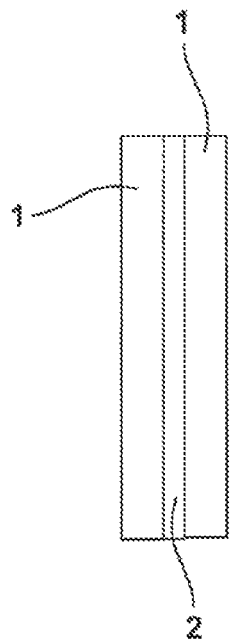
FIG. 3 schematically shows the cover lens with an internal wavelength-shifting coating.

According to FIG. 3, it is provided that the cover lens 1, which is shown schematically there and is formed from two parts, has a coating 2 or layer on the inside which is made of a wavelength-shifting material, for example a fluorescent layer.

Figure 4:
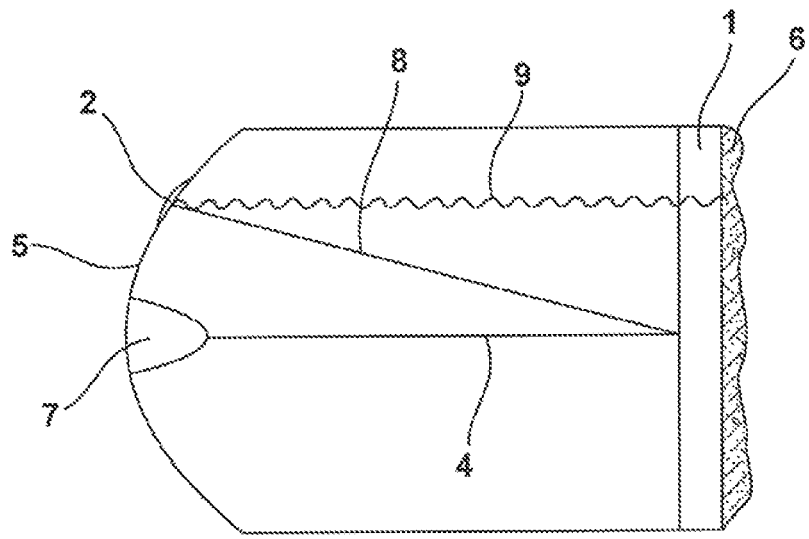
FIG. 4 schematically shows the scattered light, on the one hand formed as direct light from the light source and on the other formed by the reflected visible light on the ice/snow on the cover lens.

In the illustration according to FIG. 4, a light 4 generated by a light source 7 is provided in the short-wave visible range, wherein scattered light 8, for example caused by the ice layer 6, exits from said light, for example strikes the coating 2, for example the reflector 5, with a fluorescent substance and there, is at least partially absorbed and emitted as long-wave radiation. In this case, the emitted radiation 9 with portions in the infrared region is directed toward the cover lens 1, wherein the latter is heated by absorption and/or the long-wave radiation 9 is passed through the cover lens 1, is incident on the ice/snow layer 6 and causes the direct melting of the ice or snow there.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device of a vehicle, the lighting device comprising:
   a cover lens;
   a light source for generating light;
   a shifter to shift a wavelength of at least a portion of the light generated by the light source from a visible, short-wave range radiation into an infrared, long-wave range radiation, the shifter being arranged in the light such that the long-wave range radiation generated is directed towards the cover lens.

2. The lighting device according to claim 1, wherein the shifter to shift the short-wave range radiation into the long-wave range radiation is a wavelength-shifting coating.

3. The lighting device according to claim 2, wherein the wavelength-shifting coating is arranged on the cover lens.

4. The lighting device according to claim 2, wherein the wavelength-shifting coating is arranged on an inside surface of the cover lens.

5. The lighting device according to claim 2, wherein the wavelength-shifting coating is arranged on an outside surface of the cover lens.

6. The lighting device according to claim 2, wherein the wavelength-shifting coating is a fluorescent layer.

7. The lighting device according to claim 1, wherein the shifter to shift the short-wave range radiation into the long-wave range radiation is a substance arranged in the cover lens.

8. The lighting device according to claim 7, wherein the substance is fluorescent.

9. The lighting device according to claim 7, wherein the substance is arranged as a layer in or on the cover lens.

10. The lighting device according to claim 7, wherein the substance is added to a material of the cover lens before the cover lens is shaped.

11. The lighting device according to claim 1, wherein the light is formed as scattered light, wherein in an interior of the lighting device, the shifter to shift the short-wave range radiation into the long-wave range radiation is formed as a coating from a fluorescent material, which is arranged in the scattered light.

12. The lighting device according to claim 11, wherein the coating is arranged on a surface inside the lighting device, the surface comprising a reflector, a cover frame or a modular cover.

13. The lighting device according to claim 1, wherein the wavelength of the long-wave range radiation is between 780 nm to 8,000 nm.

14. The lighting device according to claim 1, wherein the cover lens is an exterior lens of the lighting device through which the light exits the lighting device, such that an outside surface of the cover lens comes in contact with environmental elements outside of the lighting device.

* * * * *